(12) United States Patent
Borrelli et al.

(10) Patent No.: US 6,775,062 B2
(45) Date of Patent: Aug. 10, 2004

(54) POLARIZING GLASSES

(75) Inventors: Nicholas F. Borrelli, Elmira, NY (US); Donald M. Trotter, Jr., Newfield, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/400,329

(22) Filed: Mar. 27, 2003

(65) Prior Publication Data

US 2003/0202245 A1 Oct. 30, 2003

Related U.S. Application Data

(62) Division of application No. 10/059,963, filed on Jan. 24, 2002, now Pat. No. 6,563,639.

(51) Int. Cl.[7] .......................... G02B 5/30; C03C 32/00; C03C 4/00

(52) U.S. Cl. ...................... 359/492; 359/490; 359/483; 52/30.1; 52/32.1; 52/33.3

(58) Field of Search ................................ 359/483, 485, 359/490, 492, 486; 65/30.1, 32.1, 33.3

(56) References Cited

U.S. PATENT DOCUMENTS

| | | | |
|---|---|---|---|
| 2,319,816 A | * 5/1943 | Land ........................... 359/490 |
| 3,540,793 A | 11/1970 | Araujo et al. ................ 350/147 |
| 4,125,404 A | 11/1978 | Araujo et al. .................. 106/54 |
| 4,304,584 A | 12/1981 | Borrelli et al. ............. 65/30.11 |
| 4,479,819 A | 10/1984 | Borelli et al. .............. 65/30.11 |
| 4,891,336 A | 1/1990 | Prassas ........................ 501/13 |
| 4,980,318 A | 12/1990 | Araujo ........................ 501/13 |
| 5,007,948 A | 4/1991 | Araujo ...................... 65/30.13 |
| 5,023,209 A | * 6/1991 | Grateau et al. ................ 501/13 |
| 5,426,077 A | 6/1995 | Brocheton et al. ............ 501/13 |
| 5,517,356 A | 5/1996 | Araujo et al. ................ 359/490 |
| 5,886,820 A | 3/1999 | Tajima et al. ................ 359/492 |
| 5,932,501 A | 8/1999 | Brocheton .................... 501/64 |
| 6,156,684 A | * 12/2000 | Sato et al. .................... 501/45 |
| 6,167,727 B1 | 1/2001 | Tajima et al. ................ 65/30.1 |
| 6,298,691 B1 | 10/2001 | Borrelli et al. .............. 65/30.1 |
| 6,313,947 B1 | 11/2001 | Takahashi et al. .......... 359/492 |

* cited by examiner

*Primary Examiner*—John Juba, Jr.
(74) *Attorney, Agent, or Firm*—Timothy M. Schaeberle

(57) ABSTRACT

Polarizing glass articles and methods of manufacturing polarizing glass articles are disclosed. Optical isolators using the polarizing glass articles have reduced coupling and surface losses when compared with conventional optical isolators.

4 Claims, 1 Drawing Sheet

POLARIZING GLASSES

This application is a divisional of U.S. application Ser. No. 10/059,963, filed Jan. 24, 2002, now U.S. Pat. No. 6,563,639.

FIELD OF THE INVENTION

This invention relates to polarizing glasses. More particularly, the invention relates to polarizing glasses and polarizing articles such as optical isolators made from such glasses.

BACKGROUND OF THE INVENTION

A polarizing effect can be obtained in glasses containing silver halide, copper halide, or copper-cadmium halide crystals. These crystals can be precipitated in aluminosilicate glasses having compositions containing suitable amounts of an indicated metal and a halogen other than fluorine.

The polarizing effect is generated in these crystal-containing glasses by stretching the glass, and then exposing its surface to a reducing atmosphere. The glass is placed under stress at a temperature above the glass annealing temperature to elongate the glass, thereby elongating and orienting the crystals. The elongated article is then exposed to a reducing atmosphere at a temperature above 250° C., but not over 25° C. above the glass annealing point. This develops a surface layer in which at least a portion of the halide crystals are reduced to elemental silver or copper (hereafter "metal").

The growth of halide particles cannot occur at temperatures below the strain point of the glass because the viscosity of the glass is too high. Higher temperatures, above the annealing point, are preferred for crystal precipitation. Where physical support is provided for the glass body, temperatures up to 50° C. above the softening point of the glass can be employed. A process for the production of polarizing glass is described in detail in U.S. Pat. No. 4,479,819.

Polarizing glasses of the type described above are used to make polarizing elements that are used in equipment including but not limited to optical communication equipment, optical recording equipment, optical sensors, and optical interferometers. Optical isolators, which are used in optical communication systems, include a first polarizer, a Faraday rotator, and a second polarizer arranged on an optical axis in a holder. Two major uses of optical isolators are in optical transmission systems and in fiber-optic amplifiers. Insertion loss of an optical isolator is an important consideration in the manufacture of an optical isolator, and insertion loss should be kept to a level less than about 0.5 dB.

Insertion loss can generally be attributed to three factors: surface loss, absorption loss and coupling loss. Surface loss is the loss between the various surfaces of the components that make up an optical isolator, and differing refractive indices between components contribute to surface loss. The refractive index of the polarizing glass described in U.S. Pat. No. 4,479,819 is 1.508 or less. The refractive index of the Faraday rotator is typically around 2.4, and this large difference in refractive index contributes to the surface loss in an isolator component. Even though antireflection (AR) coatings can reduce surface loss, it would be desirable to provide other ways to reduce surface loss. Coupling loss is typically between about 0.15 and 0.25 dB. It would be desirable to provide a polarizer made from a polarizing glass that having reduced coupling and surface losses when compared with conventional polarizers.

SUMMARY OF INVENTION

One embodiment of the present invention relates to a polarizing glass article that is phase-separated by precipitating silver halide, copper halide, or copper-cadmium halide crystals and that contains silver, copper, or copper cadmium metal particles having an aspect ratio of at least 2:1. According to this embodiment, the article has a refractive index greater than 1.55. In other embodiments, the article has a refractive index greater than 1.6. In preferred embodiments, the article has a refractive index greater than 1.65.

Another embodiment of the invention pertains to optical isolators including polarizing glass articles made in accordance with the present invention. One advantage of optical isolators using polarizers in accordance with the present invention is that isolators exhibit low coupling loss. For example, according to one embodiment, an optical polarizer having a refractive index greater than 1.6 and a thickness of 50 microns disposed between two single mode fibers has a coupling loss less than 0.35 dB.

Another embodiment of the invention relates to a method of manufacturing a polarizing glass article. The method includes the steps of melting a batch of glass having a refractive index greater than 1.6 and containing a source of silver, copper or copper and cadmium and at least one halogen, cooling and shaping the melt into a glass article, and subjecting the glass article to an elevated temperature for a period of time sufficient to generate and precipitate silver halide, copper halide or copper-cadmium halide crystals in the glass. The method also includes the steps of elongating the glass article under stress at a temperature above the annealing point of the glass to elongate the crystals in the direction of the stress and exposing the elongated glass article to a reducing atmosphere at an elevated temperature to initiate reduction to silver or copper metal. In a preferred embodiment, the glass article has a refractive index greater than 1.6, and in a highly preferred embodiment, the glass article has a refractive index greater than 1.65. In certain embodiments, the temperature for precipitating silver halide, copper halide or copper-cadmium halide crystals in the glass is at least about 50° C. above the softening point of the glass and the time sufficient for precipitating the crystals is between two hours and four hours. In other embodiments, the temperature at which the glass article is elongated under stress is at least about 50° C. below the softening point of the glass. In other embodiments, the temperature at which the glass article is exposed to a reducing atmosphere is greater than about 250° C.

Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1:
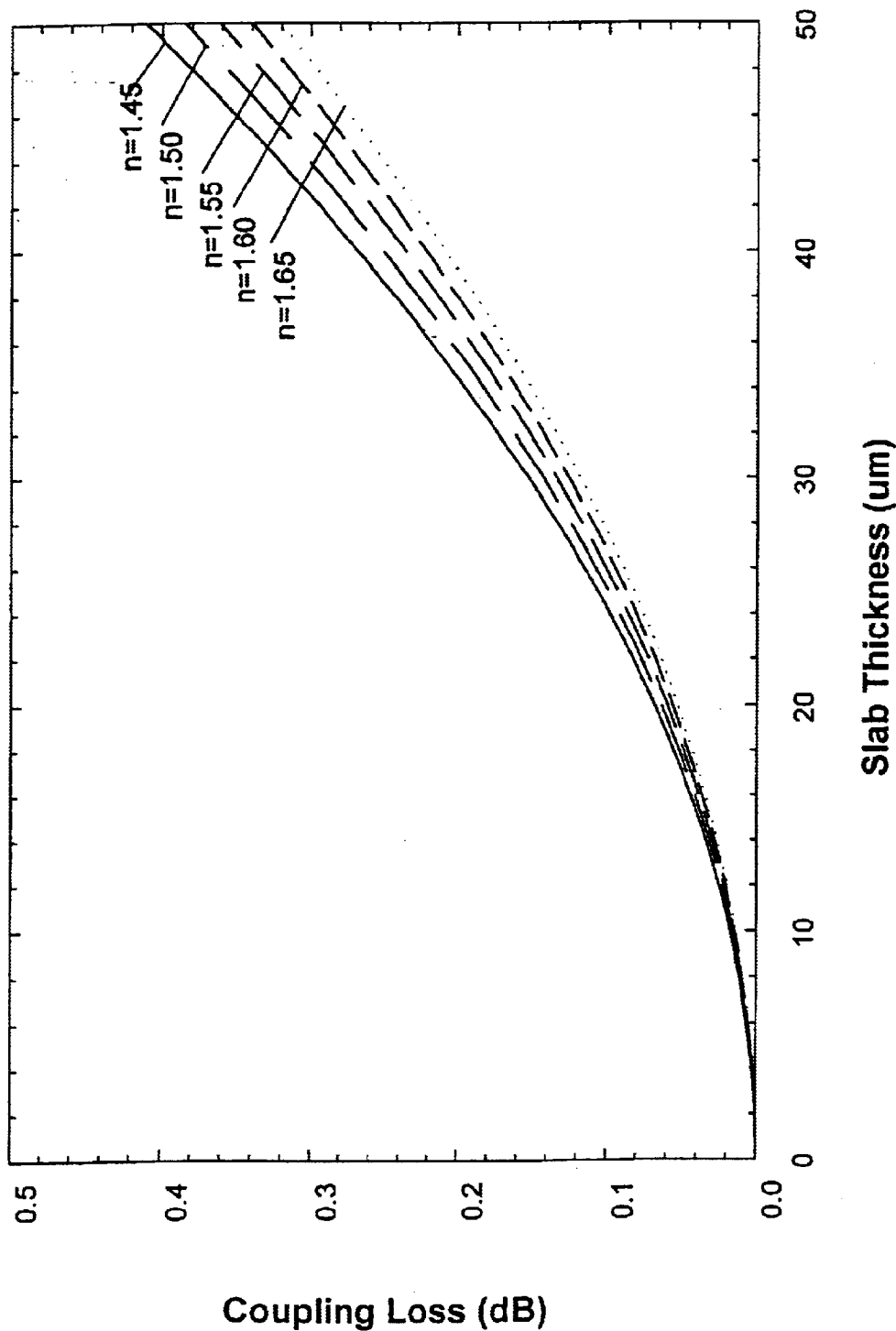
FIG. 1 is a graph showing the effect of refractive index on coupling loss versus slab thickness for a polarizer disposed between two single mode fibers.

Before describing several exemplary embodiments of the invention, it is to be understood that the invention is not limited to the details of construction set forth in the following description. The invention is capable of other embodiments and of being practiced or being carried out in various ways.

The manufacture of polarizing glass elements is known and described in U.S. Pat. Nos. 4,304,584 and 4,479,819. One embodiment of the invention pertains to glass polarizers having an aluminum borosilicate base composition and a refractive index that is greater than 1.55, and preferably greater than 1.65.

The polarizing glass elements and methods of the invention may be practiced with any aluminum borosilicate base glass in which a sufficient volume of metal halide crystals can be precipitated and that has a refractive index greater than 1.55, preferably greater than 1.6, and more preferably greater than 1.65.

Applicants have identified certain host glass compositions having refractive indices greater than 1.55 which are disclosed in U.S. Pat. No. 5,932,501 (the '501 patent), which teaches that the compositions are useful for photochromic glasses. However, there is no teaching or suggestion that these glasses can be used as host glasses for manufacturing polarizing glass articles. Thus, in accordance with certain embodiments of the invention, applicants have identified the compositions in Examples 2–9 of the '501 patent, which have refractive indices between 1.58 and 1.65, as suitable host glasses for making polarizing glass articles. The compositions disclosed in the '501 patent include the following constituents, in weight percent:

| | |
|---|---|
| $SiO_2$ | 35–47 |
| $B_2O_3$ | 12–19 |
| $ZrO_2$ | 6.5–12 |
| $Al_2O_3$ | 0–6 |
| $Li_2O$ | 1.5–3 |
| $Na_2O$ | 2–5 |
| $K_2O$ | 2–7 |
| CuO | 0.25–0.75 |
| Cl | 0.1–2 |
| CaO | 0–3 |
| SrO | 0–7 |
| BaO | 2–7 |
| ZnO | 0–3 |
| $Y_2O_3$ | 0–12 |
| $La_2O_3$ | 8–20 |
| SnO | 0.2–2.5 |
| Br | 0.1–2 |

It is necessary to add an appropriate amount of silver or copper metal to the batch to obtain polarizing properties. For example, 0.2 to 0.3% by weight of Ag or Cu can be added to the batch.

Other compositions identified by applicants that can be used in accordance with some embodiments of the present invention include compositions disclosed in U.S. Pat. No. 4,891,336, which have refractive indices between 1.585 and 1.610. These glass compositions consist essentially of the following compositions, on a weight percent basis:

| | |
|---|---|
| $SiO_2$ | 33–50 |
| $B_2O_3$ | 15–20 |
| $ZrO_2$ | 1–4 |
| $Al_2O_3$ | 5–8 |
| $Li_2O$ | 2–2.5 |
| $Na_2O$ | 0.3–2.5 |
| $K_2O$ | 3–8 |
| CaO | 0 |
| SrO | 2–8 |
| BaO | 0 |
| ZnO | 0 |
| $Nb_2O_5$ | 8–14 |
| $La_2O_3$ | 0 |
| $TiO_2$ | 2–7 | to which should be added the following elements in weight percent in excess of 100%:

| | |
|---|---|
| CuO | 0.00070–0.0350 |
| Cl | 0.170–0.360 |
| Br | 0.130–0.220 |
| Ag | 0.130–0.280 |

Still other compositions having relatively high indices of refraction that have been identified in accordance with certain embodiments of the present invention are disclosed in U.S. Pat. No. 5,023,209, which exhibit refractive indices exceeding 1.59. These glass compositions exhibit increased refractive index by combining $ZrO_2$ and $K_2O$ optionally with $Li_2O$ and consist essentially of on a weight percent basis of:

| | |
|---|---|
| $SiO_2$ | 43–52 |
| $B_2O_3$ | 12.5–18 |
| $ZrO_2$ | 3–8 |
| $Al_2O_3$ | 0–3 |
| $Li_2O$ | 1.5–3.5 |
| $Na_2O$ | 0.3–3 |
| $K_2O$ | 2–9 |
| CaO | 0–5 |
| SrO | 0.8–9 |
| BaO | 1–9 |
| $TiO_2$ | 2–8 | to which the following elements should be added in weight percent in excess of 100%

| | |
|---|---|
| CuO | 0.00080–0.0300 |
| Cl | 0.14–0.350 |
| Br | 0.093–0.180 |
| Ag | 0.100–0.175 |

Other compositions identified by applicants that can be used in accordance with certain embodiments of the present invention are disclosed in U.S. Pat. No. 4,890,318 and have refractive indices greater than 1.59. These compositions consist essentially of on a cation percent on the oxide basis:

| | |
|---|---|
| $SiO_2$ | 35–47 |
| $B_2O_3$ | 24–38 |
| $ZrO_2$ | 2.5–8 |
| $Al_2O_3$ | 0–8 |
| $Li_2O$ | 0–15 |
| $Na_2O$ | 0–8 |
| $K_2O$ | 2–13 |
| CaO | 0–8.5 |
| SrO | 0–16 |
| BaO | 0–8.5 |
| ZnO | 0–3 |
| $Nb_2O_5$ | 0–5 |
| $La_2O_3$ | 0–3 |
| $TiO_2$ | 0–7 | to which should be added the following elements in weight percent in excess of 100%:

| | |
|---|---|
| CuO | 0.0005–0.05 |
| Cl | 0.3–0.65 |
| F | 0–0.6 |
| Br | 0.2–0.65 |
| Ag | 0.15–0.4 |

According to certain embodiments of the present invention, polarizing glass elements are provided through the manufacture of a high index glass batch such as one of the glass batches described above. The high index glass batch includes a precipitated crystal phase of silver halide, copper halide, or copper-cadmium halides, the crystals being elongated and oriented. At least a portion of the crystals near the surface of the article are at least partially reduced to metallic silver or copper.

Other embodiments of the invention reside in a method of producing a glass polarizer having a refractive index greater than 1.55, and preferably greater than 1.6, and more preferably greater than 1.65 by using one of the host glass compositions described above. The method includes the steps of batch melting a high index aluminum borosilicate glass containing copper or silver oxide, such as the compositions disclosed above, with a sufficient amount of a halogen such as chlorine bromine to react with the copper or silver. The method further includes the steps of precipitating a copper halide or silver halide crystal phase in the glass and subjecting the glass to a stress in at least one direction to elongate the glass and the copper or silver halide crystals contained therein. Thereafter, the glass is exposed to a reducing atmosphere to reduce at least a portion of the copper or silver halide crystallites in a thin layer near the surface of the glass.

More specifically, the steps for producing a polarizing glass article includes four general steps:

(1) providing a batch for a high index glass containing silver or copper and at least one halide selected from the group of chloride, bromide, and iodide is melted and the melt shaped into a glass body of a desired configuration;

(2) the glass body is subjected to a defined heat treatment to cause the generation of silver or copper halide particles therein of a desired size;

(3) the glass body is elongated under stress within a defined temperature range to elongate said silver or copper halide particles and to align them in the direction of the stress; and (4) the elongated glass body is exposed to a reducing environment within a defined temperature range to reduce at least a portion of the silver halide or copper halide particles to elemental or metallic silver or copper which is deposited in and/or upon said elongated particles.

The observance of the heat treating parameters of each of Steps (2), (3), and (4) is important to achieving the desired polarizing properties in the final product. To illustrate, the generation of silver halide or copper halide particles in the glass body required temperatures above the strain point, preferably above the annealing point, and, where physical support is provided for the glass body as, for example, confinement in a mold, temperatures 50° C. in excess of the softening point of the glass can be utilized. Temperatures above the annealing point are economically desirable since, as is well-recognized in the art, particle growth occurs more rapidly as the temperature is raised, provided the maximum solubility temperature of the particles is not exceeded. The duration of heat treatment is typically between about two and six hours. The exact temperatures for each of the steps will depend on the composition of the glass and can be determined by routine experimentation.

The elongation of the glass body (and the silver halide or copper halide particles previously generated therein) will be conducted at temperatures above the annealing point but below the softening point of the glass, i.e., at temperatures where the glass exhibits a viscosity greater than $10^8$ poises. In general, the elongation will be carried out at temperatures at least 50° C. below the softening point to allow high stresses to be developed and to prevent respheroidization of particles.

Firing of the elongated body in a reducing environment will be carried out at temperatures above about 250° C. but no higher than 25° C. above the annealing point and, preferably, somewhat below the annealing point of the glass to again preclude any tendency of the particles to respheroidize.

Referring now to FIG. 1, which shows the effect of higher refractive index of a polarizer slab on coupling loss when the slab is inserted between two single mode fibers. As shown in FIG. 1, a 50-micron thick slab having a refractive index of 1.65 has a coupling loss of about 0.32 dB. A slab having a refractive index of 1.60 and a thickness of 50 microns has a coupling loss of about 0.34 dB. A slab 50 microns thick and having a refractive index of 1.45 exhibits a coupling loss over 0.40 dB. This reduced coupling loss is important in thin polarizer products that are used in direct coupling applications between two waveguides. Raising the index reduces coupling loss for pieces having the same thickness. Alternatively, it may be desirable in certain applications to use a thicker slab of polarizer glass, which is easier to manufacture and handle and less prone to breaking. By raising the refractive index of the polarizer glass, thicker slabs of glass can be used without adversely raising the coupling loss of the polarizer. Another benefit of raising the refractive index of the polarizer is that with a higher index, the variability of coupling loss with thickness difference (the quasi-slope of the curve in FIG. 1) is smaller when compared with a lower refractive index slab.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A polarizing glass article made by a method comprising the steps of:

melting a batch containing a source of silver, copper or copper-cadmium and at least one halogen;

cooling and shaping the melt into a glass article;

subjecting the glass article to an elevated temperature for a period of time sufficient to generate and precipitate silver halide, copper halide or copper-cadmium halide crystals in the glass;

elongating the glass article under stress at a temperature above the annealing point of the glass to elongate the crystals in the direction of the stress; and exposing the elongated glass article to a reducing atmosphere at an elevated temperature to initiate reduction to silver or copper metal, wherein the glass article has a refractive index greater than 1.65.

2. The polarizing glass article of claim 1, wherein the temperature for precipitating silver halide, copper halide or copper-cadmium halide crystals in the glass is at least 50° C. above the softening point of the glass and the time sufficient for precipitating the crystals is between two hours and four hours.

3. The polarizing glass article of claim 1, wherein the temperature at which the glass article is elongated under stress is at least 50° C. below the softening point of the glass.

4. The polarizing glass article of claim 1, wherein the temperature at which the glass article is exposed to a reducing atmosphere is greater than 250° C.

* * * * *